United States Patent
Hegde

(10) Patent No.: US 7,577,704 B1
(45) Date of Patent: Aug. 18, 2009

(54) METHODS AND SYSTEMS FOR IMPLEMENTING CUSTOMIZED DATA TO CONTROL GROUPWARE ENVIRONMENT DATA EXCHANGE

(75) Inventor: Prabhat L. Hegde, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 687 days.

(21) Appl. No.: 11/217,522

(22) Filed: Aug. 31, 2005

(51) Int. Cl.
*G06F 15/16* (2006.01)
*G06F 15/173* (2006.01)
(52) U.S. Cl. .................. 709/205; 709/206; 709/230
(58) Field of Classification Search ........... 709/205, 709/206, 223, 230
See application file for complete search history.

(56) References Cited

U.S. PATENT DOCUMENTS

2001/0044827 A1* 11/2001 Zhuk ..................... 709/205
2002/0049738 A1* 4/2002 Epstein ................... 707/1

\* cited by examiner

*Primary Examiner*—Patrice Winder
*Assistant Examiner*—Tanim Hossain
(74) *Attorney, Agent, or Firm*—Martine Penilla & Gencarella, LLP

(57) ABSTRACT

A method for setting up an schema to control data-exchange within a groupware environment is provided. The groupware environment has an administrator. A customized attribute associated with the data-exchange within the groupware environment is defined. A preferred customized attribute value for the groupware environment is identified. A preferred customized attribute value for a participant of the groupware environment is determined. A policy for the data-exchange between the participant of the groupware environment and the administrator of groupware environment based on the preferred customized attribute value of the groupware environment and the preferred customized attribute value of the participant is determined.

14 Claims, 7 Drawing Sheets

|   | Attributes | Admin | Level 1 | | Level 2 | | Level 3 | |
|---|---|---|---|---|---|---|---|---|
|   |   |   | ... | K M | ... | Bob | Joe | Steve |
| 1 | Supervisior | — | o | K M | o | K | Bob | Bob |
| 2 | Department Name | o | o | o | o | o | o | o |
| 3 | Subdepartment Name | o | o | o | o | o | o | o |
| 4 | Organization Names | o | o | o | o | o | o | o |
| 5 | Display Names | o | o | o | o | o | o | o |
| 6 | Email | Admin@E.com |  | K@E.com |  | Bob@E.com | Joe@E.com | Steve@E.com |
| 7 | Aliases | o | o | o | o | o | o | o |
| 8 | Job Title | o | o | o | o | o | o | o |
| 9 | Login ID | o | o | o | o | o | o | o |
| 10 | Name | Admin | o | K | o | Bob | Joe | Steve |
| 11 | Office Location | o | o | o | o | o | o | o |
| 12 | Home Address | o | o | o | o | o | o | o |
| 13 | Phone Number | o | o | o | o | o | o | o |
| 14 | Document Type Pref. | Star office / Override No | o | o | o | Star Office / Override No | MS Word / Override No | Star Office / Override No |
| 15 | Email Protocol Pref. | P2P / Override Yes | o | o | o | P2P 1 / SSH 2 / SMTP 3 / Override Yes | P2P / Override No | MIME / Override Yes |
| 16 | Email Size Limit Pref. | Size 2 / Override No | o | o | o | Size 3 / Override No | Size 2 / Override No | Size 5 / Override No |
| 17 | Mailing List Pref. | o | o | o | o | o | o | o |
| 18 | Communication Pref. | o | o | o | o | o | o | o |
| 19 | Document Collaboration Pref. | o | o | o | o | o | o | o |
| 20 | Blocking Pref. | o | o | o | o | o | o | o |
| ⋮ | ⋮ | ⋮ | ⋮ | ⋮ | ⋮ | ⋮ | ⋮ | ⋮ |

| | Attributes | Bob Schema X | Joe | Steve | Rick |
|---|---|---|---|---|---|
| 1 | Supervisior | K | Bob | Bob | L |
| 2 | Department Name | o | o | o | o |
| 3 | Subdepartment Name | o | o | o | o |
| 4 | Organization Names | Enterprise | Enterprise | Enterprise | Enterprise |
| 5 | Display Names | Bob | Joe | Steve | Rick |
| 6 | Email | Bob@E.com | Joe@E.com | Steve@E.com | Rick@E.com |
| 7 | Aliases | X,X',Y,Y'',Z,W,W' | Y,Y',Y'',Z,Z',X,X',W,W' | Z,Z',W,X,Y,Y' | W,W',X,X',Y,Y'',Z |
| 8 | Job Title | o | o | o | o |
| 9 | Login ID | o | o | o | o |
| 10 | Name | Bob | Joe | Steve | Rick |
| 11 | Office Location | o | o | o | o |
| 12 | Home Address | o | o | o | o |
| 13 | Phone Number | o | o | o | o |
| 14 | Document Type Pref. | Star Office  Override \| No | MS Word  Override \| No | Star Office  Override \| Yes | MS Word  Override \| No |
| 15 | Email Protocol Pref. | P2P 1 / SSH 2 / SMTP 3  Override \| Yes | P2P  Override \| No | MIME  Override \| Yes | MIME  Override \| No |
| 16 | Email Size Limit Pref. | Size 3  Override \| No | Size 1  Override \| No | Size 5  Override \| No | Size 4  Override \| No |
| 17 | Mailing List Pref. | o | o | o | o |
| 18 | Communication Pref. | o | o | o | o |
| 19 | Document Collaboration Pref. | o | o | o | o |
| 20 | Blocking Pref. | o | o | o | o |
| 21 ⋮ | ⋮ | ⋮ | ⋮ | ⋮ | ⋮ |

FIG. 3A

|  | Bob<br>Schema X | Joe | Steve | Rick |
|---|---|---|---|---|
|  | ○<br>○<br>○ | ○<br>○<br>○ | ○<br>○<br>○ | ○<br>○<br>○ |
| 14 | Document Type Preference:<br><br>Star Office 7X | MS~~Word~~ → Star Office [Admin]<br>Override: No | Star Office<br>Override: Yes | MS Word<br>Override: No |
| 15 | Email Preference:<br>1-P2P<br>2-SSH<br>3-SMIP | SMTP<br>Override: No | ~~MIME~~ → P2P [Admin]<br>Override: Yes | MIME<br>Override: No |
| 16 | Email size Limit Preference:<br>~~Size 3~~ → Size 2 [Admin]<br>Override: No | Size 1<br>Override: No | ~~Size 5~~ → Size 2 [Admin]<br>Override: No | Size 3<br>Override: No |
| ○<br>○<br>○ | ○<br>○<br>○ | ○<br>○<br>○ | ○<br>○<br>○ | ○<br>○<br>○ |

METHODS AND SYSTEMS FOR IMPLEMENTING CUSTOMIZED DATA TO CONTROL GROUPWARE ENVIRONMENT DATA EXCHANGE

BACKGROUND

1. Field of the Invention

The present invention relates to data-exchange within a groupware environment and, more particularly, to methods and systems for controlling data-exchange within a groupware environment.

2. Description of the Related Art

A groupware environment can include messaging, calendaring, document sharing, or instant messaging functions. Data exchange mechanisms implemented in a groupware environment, however, cannot allow user-based or task-based customization across an entire set of groupware functions. For example, exchanging a document using the mail data exchange protocols can only be achieved thru sending the entire document as an email attachment to all the recipients. However, several drawbacks can be associated with the methods of handling data-exchange, such as documents, between the members of an email group. For instance, sending the entire document as an email attachment negatively affects the network bandwidth and unnecessarily consumes data storage resources. For instance, an exemplary email group can include six (6) members each using a different data exchange protocol. The sender can send a text document as an email attachment to the remaining five members (i.e., the recipients). In this manner, each of the five recipients can review and edit the document. Subsequently, five emails, each including a respective modified version of the document, can be sent back to the sender. The sender then reviews each of the five versions of the attached document so as to determine whether any modifications has been made to the document. Thereafter, the sender has to further incorporate the modifications in each of the five versions of documents into a single document. Of course, reviewing each of the modified documents as well incorporating all the modifications into a single version of the document not only unnecessarily wastes sender's valuable time but also is tedious and time consuming. Another limitation associated with data-exchange is that each recipient can be aware of only the recipient's own modifications to the document and, not any of the modifications made by any of the remaining recipients.

Still another drawback associated with the methods of handling data-exchange as email attachments is the inappropriate utilization of storage. Currently, document attachments are delivered to the email boxes of all the members, needlessly occupying the respective members' limited storage space allocated to the members. Such waste of email storage space is more pronounced for the sender, as the sender may receive five separate emails, each including a separate modified version of the document. In certain scenarios, lack of adequate email storage can be remedied by acquiring additional email storage. However, obtaining extra storage can be rather costly.

Of course, the limitations associated with data-exchange as email attachments are only a few of the deficiencies associated with data-exchange between members of a groupware environment wherein each member uses a respective data exchange protocol. For instance, a variety of software applications can be implemented to exchange a variety of data and data types between the members of a groupware. However, the data-exchange using software applications cannot be achieved efficiently or without breaking the data exchange protocols. Nor can data-exchange be controlled by the groupware members.

In view of the foregoing, there is a need for systems and methods capable of minimally affecting data exchange protocols while efficiently exchanging data between the members of the groupware environment.

SUMMARY

Broadly speaking, the present invention fills these needs by providing a method, apparatus, and system capable of efficiently exchanging data between members of a groupware environment while minimally affecting data exchange protocols. It should be appreciated that the present invention can be implemented in numerous ways, such as a process, an apparatus, a system, a device, or a method on a computer readable medium. Several inventive embodiments of the present invention are described below.

In one embodiment, a method for setting up an schema to control data-exchange within a groupware environment is provided. The groupware environment has an administrator. A customized attribute associated with the data-exchange within the groupware environment is defined. A preferred customized attribute value for the groupware environment is identified. A preferred customized attribute value for a participant of the groupware environment is determined. A policy for the data-exchange between the participant of the groupware environment and the administrator of groupware environment based on the preferred customized attribute value of the groupware environment and the preferred customized attribute value of the participant is determined.

In another embodiment, a method for implementing a customized attribute to control data-exchange between members of a group defined within a groupware environment is provided. A preferred customized attribute value of an owner of the group is determined. A preferred customized attribute value of a member of the group is determined. An schema to control data-exchange between the owner of the group and the member of the group is defined. A policy for exchanging the data is determined. The data between the owner of the group and the member of the group is exchanged in accordance with the selected policy.

In still another embodiment, a computer program embodied on a computer readable medium for setting up an schema to control data-exchange within a groupware environment is provided. The groupware environment has an administrator. Program instructions for defining a customized attribute associated with the data-exchange within the groupware environment are provided. Program instructions for identifying a preferred customized attribute value for the groupware environment are provided. Program instructions for determining a preferred customized attribute value for a participant of the groupware environment are provided. Program instructions for determining a policy for the data-exchange between the participant of the groupware environment and the administrator of groupware environment based on the preferred customized attribute value of the groupware environment and the preferred customized attribute value of the participant are provided.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 2 illustrates an exemplary enterprise schema for the exemplary enterprise illustrated in FIG. 1, in accordance with another embodiment of the present invention.

FIG. 3A illustrates an exemplary schema created by the owner of an exemplary alias depicted in FIG. 1, in accordance with still another embodiment of the present invention.

FIG. 3B illustrates three exemplary customized attributes implemented to control data-exchange between members of the exemplary alias created in FIG. 1, in accordance with still another embodiment of the present invention.

DETAILED DESCRIPTION

Figure 1:
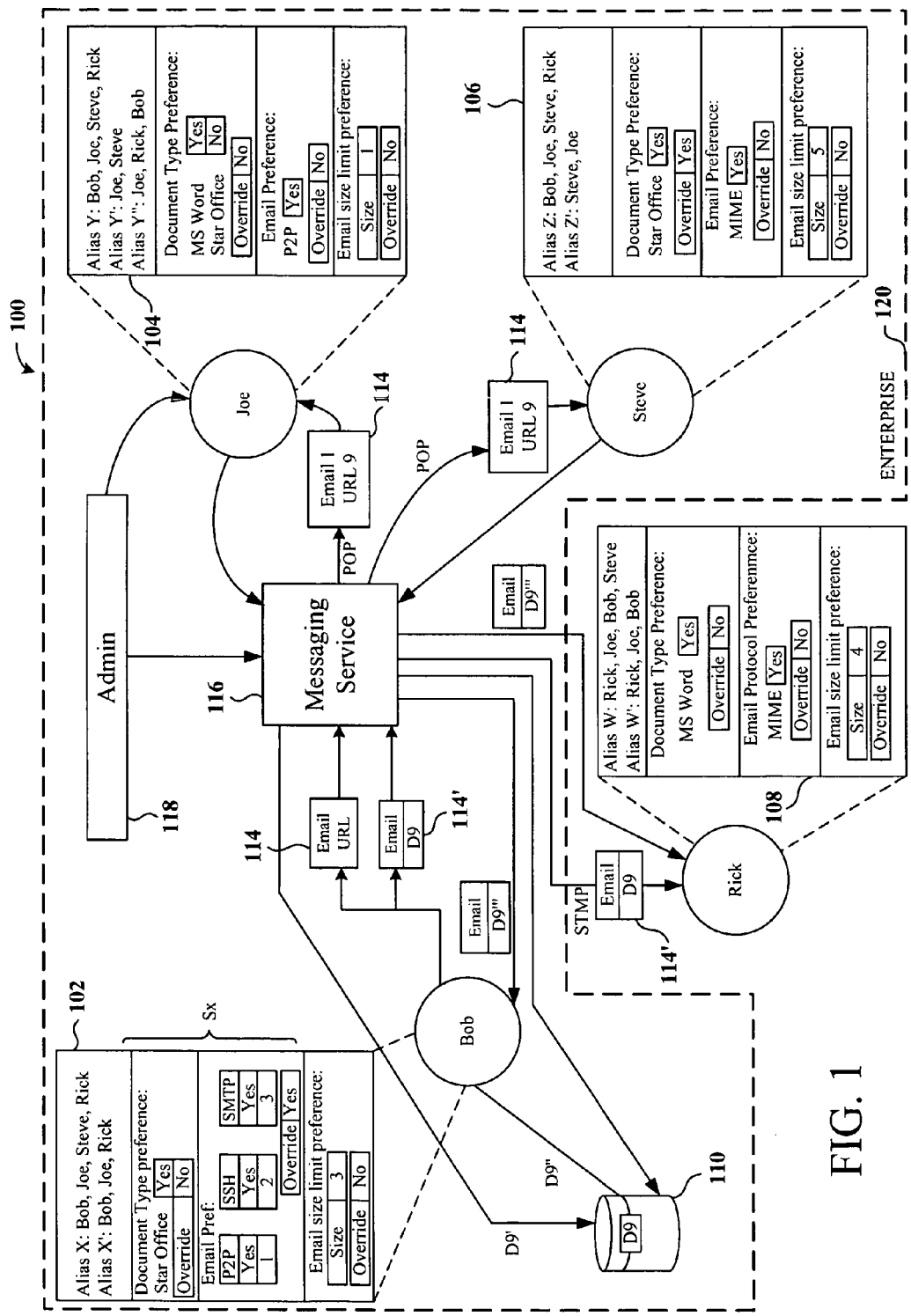
FIG. 1 is a simplified block diagram illustrating data-exchange between members of an alias defined within a groupware environment, in accordance with one embodiment of the present invention.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

One of ordinary skill in the art must recognize and appreciate that although specific reference may have been made to terminology defined by Sun Microsystems, Inc., it should be understood that any name could be used for such terms, so long as the desired functionality is achieved.

Various embodiments for methods and systems for controlling data-exchange between participants of a groupware environment (herein interchangeably referred to an groupware) are provided. In one aspect of the present invention, a plurality of customized attributes can be implemented to control data-exchange among the members of the groupware. According to one embodiment, an enterprise schema is created so as to set up privileges, access policies, and attribute preferences of members of the enterprise, and to control data-exchange between the groupware members. In another implementation, an existing enterprise schema is enhanced so as to set up privileges, access policies, and attribute preferences of members of the enterprise, and to control data-exchange between the groupware members. In one example, the existing enterprise is lightweight directory access protocol (LDAP). In another embodiment, the existing enterprise can be an active directory compliant enterprise.

According to one embodiment, a groupware member can create an extensible markup language-based (XML) schema corresponding to an email alias created by a groupware member so as to achieve a specific data-exchange goal. The schema of the present invention enables the groupware member to control data-exchange among the members of the alias by setting up privileges, policies, and attribute preferences for the alias members. According to one aspect, controlling data-exchange among the groupware members can be achieved without breaking the interoperability of existing data exchange mechanisms.

According to one embodiment, as herein referred to, a groupware environment can include communication tools, conferencing tools, and collaborative management tools. To elaborate further, the electronic communication tools can be used for sending messages, files, data, or documents between clients and, as such, facilitate the sharing of information (e.g., emailing, faxing, voice mailing, web publishing, etc.). In the same manner, the electronic conferencing tools facilitate a more interactive manner of sharing of information (e.g., data conferencing, voice conferencing, video conferencing, Internet forums (e.g., message boards, discussion boards, etc.), chat rooms, electronic meeting systems (EMS), etc.). Likewise, the collaborative management tools can facilitate and manage group activities (e.g., electronic calendars, project management systems, workflow systems, knowledge management systems, etc.). Of course, a groupware can be web based (e.g., UseModWiki, Scoop, etc.), desktop system-based (e.g., CVS, RCS, etc.), etc.

In one aspect, the enterprise schema is configured to set up and control the privileges and access policies applicable to the members of the enterprise, and to further control, the attribute preferences as set with each of the members of the enterprise. According to one implementation, an schema is a mechanism for setting up and controlling privileges and access policies applicable to each of the members of an alias as well as controlling the attribute preferences set up by the alias members. In one arrangement, an owner of the alias can implement the enterprise schema to control the data-exchange between the members of the alias or to create an schema specifically applicable to the created alias.

In another example, an schema is a description of the structure and rules a document is configured to satisfy so as to be considered an XML document. Schema can further include the formal declaration of the elements making up a document. In one implementation of the present invention, an schema is configured to describe the manner of representing attributes that can be customized. According to one example of the present invention, the entries in a personal address book are configured to adhere to the schema.

FIG. 1 is a simplified block diagram illustrating data-exchange between members of an alias X defined within an email groupware environment, in accordance with one embodiment of the present invention. A document D9 is to be exchanged between the participants Bob, Joe, Steve, and Rick via email using a messaging service 116 of an enterprise 120. Bob, Joe, and Steve are employees of the enterprise 120, and as such, can access data stored to a storage 110. Comparatively, the participant Rick is not an employee of the enterprise 120, and as such, may not be given access to the data stored to the storage 110.

As participants of the email groupware application, Bob, Joe, Steve, and Rick can create aliases to achieve specific goals within the email groupware application. For instance, aliases X and X' have been created by Bob, aliases Y, Y', and Y" have been created by Joe, aliases Z and Z' have been created by Steve, and aliases W and W' have been created by Rick, as illustrated in boxes 102, 104, 106, and 108, respectively. As creators of the respective aliases, Bob, Joe, Steve, and Rick are owners and administrators of the respective aliases and as such, can determine the members of the corresponding aliases.

In accordance with one embodiment of the present invention, Bob is configured to provide the document D9 to recipient members of the alias X (i.e., Joe, Steve, and Rick) for review and edit. In the illustrated embodiment, Bob has created an schema SX corresponding to the alias X so as to set up privileges, access policies, and attribute preferences for the alias X members, and to further control data-exchange between the members of the alias X. As will be explained in more detail below, according to one aspect of the present invention, instead of emailing the entire document D9 as an email attachment to Joe and Steve, a pointer to the address of the document D9 in the storage 110 is sent to Joe and Steve within a body of an email 114. The latter can be achieved because the privileges and preferences set up by the administrator of the alias X (i.e., Bob) for the members of the alias X pursuant to the schema SX match with the privileges and preferences set up by Joe and Steve. In another example, Bob and any of the members of the alias X can negotiate so as to arrive at privileges and preferences that are acceptable by Bob and the alias member if the privileges and preferences set up by the alias member do not match with the privileges and preferences set by Bob. Alternatively, as described in more detail below, the entire document D9 is sent to the recipient member Rick as an attachment to an email 114'.

For ease of understanding, exemplary simplified graphic user interfaces (GUI) 102, 104, 106, and 108 show certain information about the participants Bob, Joe, Steve, and Rick, respectively. For instance, the members of exemplary aliases created by Bob, Joe, Steve, and Rick as well as respective preferences for three exemplary customized attributes are depicted. Bob has defined Bob, Joe, Steve, and Rick as members of the alias X and, Bob, Joe, and Rick as members of the alias X'. As the owner of the alias X, Bob can set up specific preferences for selected attributes applicable to each of the members of the alias X (e.g., the type of document being exchanged, the underlying email protocol to be used, maximum email size, security, etc.). As the owner of the alias X', Bob can further set up an schema SX' so as to set up the privileges and access policies applicable to the members of the alias X'. In one example, Bob may select to apply the access policies, privileges, and preferences set up by an enterprise schema, designed to act as the default schema for the enterprise 120.

With continued reference to FIG. 1, Bob's document preference type is Star Office, due to the checkmark "Yes" depicted next to the Star Office button. Bob has given the other members of the enterprise 120 permission to override Bob's preference in document type, as can be seen by the check mark "Yes" shown next to the override button. In one example, as the administrator of the alias X, preferences set by Bob may not override the preferences set by the members of the alias X unless permitted by the members. However, Bob's preferences as well as the members' preferences may be overridden by the preferences set by the administrator 118 of the enterprise 120. The latter occurs even if Bob or the members have prohibited others from overriding Bob's or the members' preferences. In the same manner, Bob has set up peer-to-peer (P2P), Secure Shell (SSH), and simple mail transfer protocol SMTP as Bob's preferred email protocols, with P2P being Bob's first choice and SMTP being Bob's last choice. Again, other members of the enterprise have been given permission to override Bob's email protocol preferences, as indicated by the check mark "Yes" depicted next to the override button. Additionally, Bob has further picked size 3 as the email size limit preference, which as can be seen, is not overridable by the members of the aliases or the enterprise 120. In one example, however, non-overridable preferences, as set by the administrator 118 of the enterprise for each of the members of the enterprise 120 are configured to override the members' preferences even if such preferences have been marked non-overridable by the members.

With continued reference to FIG. 1, Joe has defined Bob, Joe, Steve, and Rick as members of the alias Y', Joe and Steve as members of the Y' alias, and Joe, Rick, and Bob, as members of the Y" alias. Similar to Bob, Joe has set up specific preferences for the type of document being exchanged, the underlying email protocol to be used, email size limit preference, etc. applicable to each of the members of the aliases Y, Y', and Y". For instance, Joe has selected the preferred document type of MS Word by check marking the appropriate "Yes" box. Joe has further prohibited other members of the aliases Y, Y', and Y" or the employees of the enterprise 120 from overriding Joe's preferred document type preference, as indicated by the check mark "No" shown next to the override button. In the same manner, Joe has selected the email protocol P2P as Joe's preferred choice and has further prohibited others from overriding Joe's decision with respect to the preferred email protocol. Additionally, Joe has further picked size 1 as the email size limit preference, which as can be seen, is not overridable by the members of the aliases or the enterprise 120. Of course, one must note that as the administrator of the aliases Y, Y', and Y", the privileges and policies set by the respective schemas SY, SY', and SY" are to be implemented when exchanging data between the members of the aliases Y, Y', and Y". However, the latter privileges and preferences may not be implemented if overridden by the member's preferences or the administrator's preferences.

In the same manner, the alias Z created by Steve has Steve, Joe, Rick, and Bob as members and, alias Z' has members Steve and Joe. Similar to Bob and Joe, Steve has set up specific preferences for the type of document to be exchanged as well as the underlying email protocol to be used. By way of example, Steve has selected the preferred document type of Star Office by check marking the appropriate "Yes" button and has selected the multipurpose Internet mail extensions (MIME) as the preferred email protocol. However, unlike Joe, Steve has check marked "Yes" next to the override buttons corresponding to the preferred type of document as well as email protocol type. Accordingly, Steve has allowed other members of the aliases Z and Z' or the employees of the enterprise 120 to override Steve's preferences with respect to the latter preferences, unless prohibited by the enterprise administrator 118. Additionally, Steve has further picked size 5 as the email size limit preference, which as can be seen, is not overridable by the members of the aliases or the enterprise 120.

Lastly, alias W is shown to include members Rick, Joe, Bob, and Steve while alias W' includes the members Rick, Joe, and Bob. Similar to the other three members, Rick has set up specific preferences for the type of document being exchanged, the underlying email protocol to be used, the email size limit preference, etc. For instance, Rick has selected the preferred document type of MS word by check marking the appropriate box and has selected the email protocol MIME as the preferred email protocol. Rick has further picked size 4 as the email size limit preference, which as can be seen, is not overridable by the members of the aliases or the enterprise 120. Similar to Joe, Rick has prohibited other members of the aliases from overriding Rick's preference concerning the preferred type of document. Rick has further prohibited other members of the aliases from overriding Rick's preference with respect to the email protocol. However, one must note that while Rick is a member of several aliases and a participant of the email groupware, Rick is not one of the employees of the enterprise 120, and as such, Rick's preferences may not be overridden by the administrator 118 of the enterprise 120. Additional information with respect to the limitations on overriding non-employee member's (i.e., Rick) preferences is provided below with respect to FIGS. 2, 3A, and 3B. One must note that as the administrators of the aliases Z and Z' and, W and W', Steve and Rick's preferences are to be considered when communicating with other members of the corresponding aliases Z and Z' and, W and W' unless such preferences are overridden by the alias member or such preferences are in conflict with non-overridable preferences set up by the administrator 118.

In this manner, a single version of the document D9 can be maintained between Bob, Joe, and Steve, as each member edits the document D9, one at a time. For instance, in the illustrated embodiment, the D9 document can be first accessed and modified by Joe. Thereafter, the modified version D9' is saved to the storage 110 at the same address as D9. Steve can then access the D9' document. At this point, Steve can determine the modifications made to the D9 document by Joe, and can further make additional modifications to the document D9', if Steve so desires. The modified document D9" is then stored back to the storage 110 by Steve. Bob, however, cannot proceed with finalizing the document D9" until Bob receives the changes made to the document D9 by Rick. According to one embodiment, once Bob receives the modified document D9'" from Rick, Bob can incorporate Rick's changes into the document D9" and create a single modified version of the document D9. As can be seen, each member of the alias can determine whether any modifications have been made to the document D9 by the members who previously reviewed the document D9. Thus, in accordance with one embodiment of the present invention, the modifications and edits are made to a single document, substantially reducing waste of email storage space and minimizing the sender's time spent on locating the modifications to the document D9 and incorporating the modifications into a single document.

One of ordinary skill in the art must appreciate that in one example, data can be exchanged between the members of the alias and modification can be made to the data based on the type of the alias, the members' roles, or the members' levels within the schema hierarchy. Additional information with respect to the schema hierarchy is provided below with respect to FIGS. 2, 3A, and 3B. By way of example, a member of an alias or the enterprise may decide not to grant others access to the member's private information. In certain scenarios, however, the member's preferences maybe overridden by the enterprise administrator 118, as certain privileges and preferences are set for all the members of the enterprise, and as such, may not be hidden or overridden by any of the members.

In one embodiment, customized attributes of the present invention can enable the groupware participants to email documents by way of different email protocols. However, the email protocols have already been established, and as such, may not be changed. Nonetheless, to achieve additional functionality, additional features maybe implemented in conjunction with the already existing email protocols. In this manner, the additional features allow the existing protocol to remain unchanged or that the additional features be implemented without disrupting the existing protocols. Additional information with respect to the customized email protocol preference attribute is provided below with respect to FIGS. 2, 3a, and 3B.

One of ordinary skill in the art must recognize and appreciate that implementing the customized attributes of the present invention to control data-exchange between the members of the alias can be implemented within any application that is part of the groupware environment (e.g., emailing, calendaring, instant messaging, word processing, client software, etc.). Additionally, one of ordinary skill in the art must recognize and appreciate that any number and/or type of customized attributes maybe implemented to facilitate data-exchange within the participants of the groupware. Furthermore, one must note that data being exchanged within the members of the groupware can be any type of data (email, plain text file, documents, image, executable, etc.). Yet further, one of ordinary skill in the art must appreciate that implementing the customized attributes to control the data-exchange can be used in conjunction with any suitable data exchange protocol (e.g., SOAP, SMTP, web calendar server (e.g., iCAL), LDAP, MIME, hypertext markup language (HTML), extensible markup language (XML), etc.).

Proceeding to FIG. 2; an exemplary enterprise schema 150 for the enterprise 120 is illustrated, in accordance with one embodiment of the present invention. In the illustrated embodiment, the enterprise schema 150 is configured to set up and control the privileges and policies applicable to each alias, role, or member defined within the enterprise schema 150. Additionally, the enterprise schema 150 establishes the hierarchy between the roles defined within the enterprise 120. For instance, the administrator 118 has the highest privilege and occupies the highest level of the hierarchy. Comparatively, roles occupying Level 1 hierarchy have the next to the highest level of privilege, and roles defined within Level 3 of the hierarchy have the lowest level of privilege. The enterprise schema 150 further includes the preferences set by the administrator for the associated attributes as well as each member of the enterprise occupying level 1 through 3 roles. By way of example, the employees such as Joe and Steve are shown to occupy the Level 3 of role hierarchy, as Joe and Steve's supervisor, Bob occupies the Level 2 role, and as Bob's supervisor, K is shown to occupy the Level 1 role.

A plurality of attributes associated with the administrator 118 and the members having Level 1-3 roles as well as the respective values are depicted. By way of example, attributes such as Supervisor, Department Name, Sub Department Name, Organization Name, Email, Aliases, Job Title, Login ID, Name, Office Location, Document Type Preference, Email Protocol Preference, Email Size Limit Preference, Mailing List Preference, Communication Preference, Document Collaboration Preference, Blocking Preference, Home address, Phone number, etc. are depicted. In row 6, email addresses of the administrator 118, K (Bob's supervisor), Bob, Joe, and Steve are depicted. In rows 14-16, customized attributes such as document type preference, email protocol preference, and email size limit preference, as well as respective values are shown.

In the illustrated embodiment, the document type preferred by the administrator 118 is Star Office, the email protocol preferred is P2P, and the email size limit preferred is size 2. The administrator 118 has given permission to the members of the enterprise 120 to override the administrator's preference with respect to the email protocol preference (as illustrated by the check mark "Yes" depicted adjacent to the override button). However, the administrator 118 has prohibited all the members of the enterprise 120 from overriding the administrator's preference of Star Office for the document type preference as well as email size limit preference (as illustrated by the check mark "No" shown adjacent to the corresponding override buttons).

In accordance with the enterprise schema 150, the administrator's preferred document type is the same as Bob and Steve's document type preferences. Thus, Bob and Steve have the capability to exchange documents in Star Office, as set by the administrator 118. Joe, however, has prohibited the other members of the enterprise 120 from overriding Joe's preference with respect to the document type. Nonetheless, as the employee of the enterprise 120, Joe's preferred choice of document type has been overridden by the administrator 118 preferred choice of document type.

In the same manner, the administrator 118 has set P2P email protocol as the administrator's email protocol preference. Notwithstanding the indicated preference, the administrator 118 has given the members of the enterprise 120 permission to override the administrator's email protocol preference, as shown by the check mark "Yes" depicted adjacent to the override button. Comparatively, Bob and Steve have given permission to members of the enterprise 120 who have the appropriate privileges (i.e., privileges associated with Level 1 and Level 2 roles, correspondingly), to override Bob and Steve's preferred email protocol type. In comparison, however, Joe has prohibited the other members of the enterprise 120 who have the appropriate privilege (i.e., higher privileges than Joe's privileges) from overriding Joe's email protocol preference.

Likewise, the administrator 118 has set the size 2 as the email size limit preference. Furthermore, the administrator 118 has prohibited the other members of the enterprise 120 from overriding the preferred email size limit (as indicated by the "No" check mark next to the override button). Bob, Joe, and Steve, however, have selected sizes of 3, 1, and 5, with Bob and Steve's selected sizes being greater than the administrator's size 2 preference. Comparatively, Joe's size 1 email size limit preference is less than the size 2 selected by the administrator 118. Additionally, Bob, Joe, and Steve have prohibited any of the members of the enterprise 120 from overriding Bob, Joe, and Steve's respective preferences. Nevertheless, the administrator 118 has overridden Bob and Steve's preferred email size limits by replacing each preference with the size 2. Of course, one of ordinary skill in the art must appreciate that same analysis can be applied to the exemplary customized attributes mailing list preference, communication preference, document collaboration preference, blocking preferences, etc.

In accordance with one embodiment of the present invention and as described in more detail below, Bob may select to choose the privileges, policies, and preferences defined within the enterprise schema 150 to govern the mailing of the document D9 to Joe, Steve, and Rick. In such a scenario, as a member of the enterprise 120, Bob may choose to set Joe and Steve's preferences in accordance with the exemplary enterprise schema 150. One must note that in the latter scenario, Rick's preferences may not be governed or overridden by the enterprise schema 150 because Rick is not a member of the enterprise 120. At this point, Bob may need to create the schema SX so as to set up policies, privileges, and preferences to control data-exchange between Bob and Rick. In accordance with one aspect, in addition to the enterprise schema 150, a respective schema can be created for each of the aliases. In this manner, if so selected by the alias member, the information can be shared with the other members of the aliases or the enterprise. In one aspect, the browser for each member of the enterprise 120 can include data about the other members of the enterprise who have chosen to share the respective attributes with the other members. According to one example, the customized attributes can be added to the members' respective address books.

In accordance with one aspect, the preferences set for the customized attributes, as defined in the present invention, can be implemented in conjunction with LDAP. LDAP is a hierarchical database, and as such, can be used to reflect the hierarchical levels of the enterprise 120. In one example, the enterprise schema 150 is configured to include the attributes provided in an active directory of LDAP together with the additional customized attributes. Furthermore, the enterprise schema 150 can be set up using data provided through GUIs wherein each of the members of the enterprise 120 or the alias specify respective preferences and the members' attributes. In another example, an application program interface (API) can be generated so as to use data organized in LDAP to determine the level of the member's role within the hierarchy and whether communication can be established with the member. Thus, according to one arrangement, a software application can be created to exploit the information stored in LDAP in conjunction with the customized added data. According to one implementation, the software application can be implemented as a part of the operating system, a desktop environment, a separate module, etc.

Proceeding to FIG. 3A, an exemplary schema SX created by Bob so as to set up and control the privileges, policies, and preferences set by members of the alias X (i.e., Joe, Steve, and Rick) is provided, in accordance with one embodiment of the present invention. In one example, Bob starts by viewing the preferences set up by Joe, Steve, and Rick. As illustrated in row 4, the schema SX includes the values for exemplary attributes such as the organization name (i.e., enterprise), display names (i.e., Bob, Joe, Steve, and Rick), and each of the respective email addresses. The schema SX further provides the membership of each alias (e.g., Bob is a member of aliases, X, X', Y, Y''', Z, W, and W', Joe is a member of Y, Y', Y''', Z, Z', X, X', W, and W', Steve is a member of Z, Z', W, X, Y, and Y', and Rick is a member of W, W', X, X', Y, Y''', and Z). Accordingly, in one embodiment of the present invention, one viewing any of the alias schemas or the enterprise schema can easily view and determine the attribute values associated with each of the members. As the owner of the alias X, Bob has specified preferences for exemplary attributes, such as document type preference, email protocol preference, and email size limit preference using the schema SX. Additional information with respect to implementing the customized attributes of the present invention to facilitate data-exchange between the members of the alias X is provided below with respect to FIG. 3B.

Reference is made to FIG. 3B depicting rows 12-14 of the schema SX illustrated in FIG. 3A, in accordance with one embodiment of the present invention. As shown in row 12, the preferred document type selected by Bob is Star Office. As such, to send the address of the document D9 to Joe, Steve, and Rick instead of emailing the entire document D9 as an attachment, Bob's preferred type of document should match Joe, Steve, and Rick's preferred type of document. In the illustrated embodiment, Steve's preferred type of document matches the preferred type of document set up by Bob. However, Joe and Rick have selected MS Word as the preferred type of document. Notwithstanding Joe's preference, the administrator's document type preference (i.e., Star Office) has overridden Joe's preferred type of document. Of course, one must note that Joe's preference has been overridden despite Joe's decision not to allow other members of the alias X or the enterprise 120 to override Joe's preferred type of document.

Comparatively, Rick's preferred type of document (i.e., MS Word) may not be overridden by the administrator 118, as Rick is not an employee of the enterprise 120. Accordingly, the document D9 should be sent to Rick as an attachment to the email 114'. One of ordinary skill in the art must appreciate that in the event Rick's preferred type of document matched the preferred type of document selected by Bob, Rick would still not have been given permission to access the document D9 as stored to storage 110 due to Rick not being employed by the enterprise 120. In such a scenario, document D9 may be stored to the web server and the hyperlink to the document D9, as stored to web server, can be sent to Rick instead of the address of the document D9 on the storage 110. In one example, Rick may need a password to access the web server.

In one implementation, even if the preferred type of document between two individuals matches, a communication may not be established if the preferred mail protocols of the two individuals do not match. In the exemplary schema SX, Bob is shown to have three different mail protocol preferences, with P2P being the first option and SMTP being the last preference. Joe is shown to have selected SMTP as the preferred mail protocol. Joe has further prohibited other members of the alias X and the enterprise 120 from overriding Joe's email protocol preference. In one embodiment, although Bob's first mail protocol preference does not match Joe's preference, negotiation maybe made between Bob and Joe until both individuals agree on a mail protocol acceptable by the two individuals. In the latter scenario, for instance, Joe's preferred mail protocol is Bob's third preference. Thus, in the illustrated embodiment, the negotiations between Joe and Bob may result in Bob and Joe using SMTP to exchange data. Steve, however, cannot negotiate with Bob, as Steve's preferred mail protocol MIME is not one of the choices selected by Bob. However, Steve has permitted the other members of the alias or the enterprise to override Steve's preference with respect to mail protocol. As a result, Steve's preference is overridden by Bob's first preference (i.e., P2P). With respect to Rick, however, negotiations cannot be performed between Bob and Rick as not only Rick's preferred mail protocol is MIME, Rick has prohibited other members of the alias from overriding Rick's choice. Consequently, Bob and Rick cannot exchange data due to having different email protocol preferences. One must appreciate that because Rick and Bob could not negotiate on a single email protocol, Rick and Bob could not have exchanged the document D9 even if the document type preferences for the two individuals matched.

In the event the two individuals have the same document type preference and agree on the same mail protocol, the two individuals may still not be capable of exchanging data if the individuals do not agree on the size limit preference set up for the exchanging data. For instance, Bob's preferred email size limit is size 3 whereas Joe, Steve, and Rick have size limits of 1, 5, and 3, respectively. In the illustrated embodiment, even though Bob is the owner of the schema SX, as a member of the enterprise 120, Bob's preferences cannot override the administrator's 118 preferences. As can be seen in FIG. 2, the administrator 118 has selected the size 2, and has further prohibited any of the members of the enterprise from overriding the administrator's 118 decision with respect to the size limit attribute. As such, Bob's preference of the size 3 is overridden by the administrator's size 2 preference. Similarly, the preferred size 5 selected by Steve is greater than the administrator's preferred size 2, and as such, is replaced by the size 2. Joe's preference, however, is size 1, which is less than the size 2 selected by the administrator 118. Rick's preference is size 3, which is greater than the preferred size 2 selected by the administrator 118. However, Rick is not a member of the enterprise 120, and as such, administrator 118 cannot override Rick's preferences. Nonetheless, in one example, Rick and Bob may not be able to communicate, as the preferred sizes cannot be matched. Particularly, as a member of the enterprise 120, Bob's preferences are still overridden by the administrator 118 while Rick's preferences cannot be overridden. One must note that the two individuals might not have been able to communicate even though the preferred size for Bob and Rick were the same.

Figure 4:
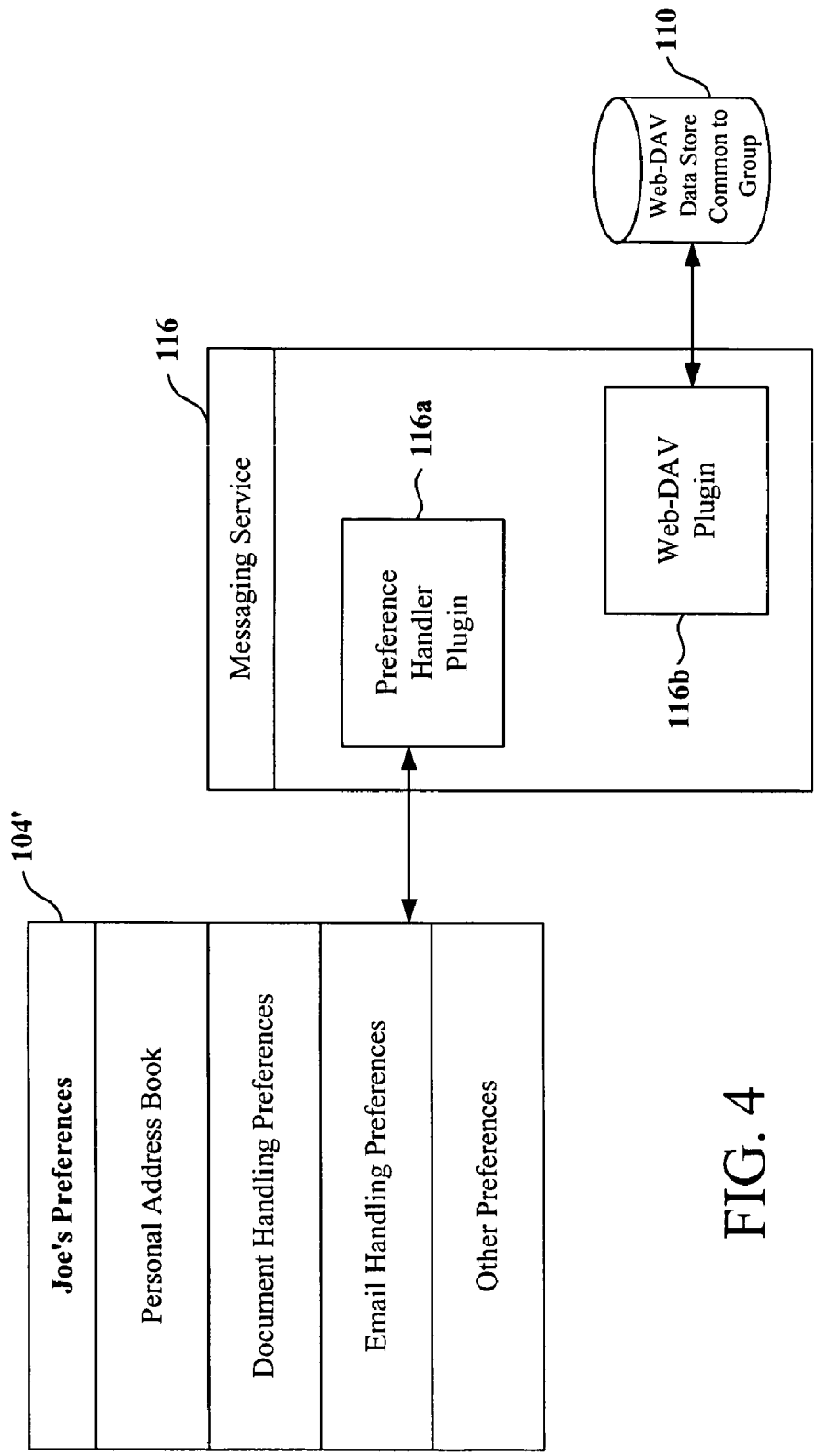
FIG. 4 depicts a data/logic flow diagram illustrating the methodology to implement customized attributes to control data-exchange in accordance with privileges, policies, and attribute preferences set up by the members of an alias, in accordance with yet another embodiment of the present invention.

FIG. 4 depicts a data/logic flow diagram illustrating the methodology to implement customized attributes to control data-exchange in accordance with privileges, policies, and attribute preferences set up by the members of an alias, in accordance with yet another embodiment of the present invention. As described previously, according to one example, Joe can communicate with other members of the alias using the messaging service 116. In one aspect, Joe is configured to set preferences (e.g., mail handling preferences, document handling preferences, etc.) for each attribute and/or behavior of mail transmission Joe intends to customize in Joe's personal address book. In one example, the personal address book is implemented to store the user's preferences.

In one example, the following exemplary attributes can be customized in an address book: the mail attachment handling preference, mail transfer protocol preference, presence preference, and document sharing preference, etc. The mail attachment handling preference enables a user to customize the manner the incoming and outgoing attachments should be handled while the mail transfer protocol preference enables a user to customize the protocol thru which the messaging service 116 handles outgoing emails. The presence preference attribute allows the groupware clients to introspect the presence of a user in a shared address book using various means of communication (e.g., instant messaging, wireless devices, etc.), while the document sharing preference permits the user to set a document sharing preference with another user of the groupware.

In one aspect, each groupware attribute being customized can include the specification of the attribute, specification of the attribute handler, specification of the ordering of the attribute handler, and implementation of the attribute handler and plugin with the applicable groupware application. According to one example, LDAP database and schema are implemented to provide the information. In accordance with one implementation, the ability of the present invention to add customized attributes and behaviors enables the present invention to provide and handle additional functionalities without substantially disrupting legacy application.

According to one embodiment, the personal address book is a preference file. In another example, however, the personal address book may be formatted depending on the software application being utilized. In another instance, the schema can be an extension of the existing address book schema (e.g., VCard). An example of the personal address book maybe stored to a VCard capable of providing a standard format and/or method for exchanging personal data. Of course, in another example, the personal address book having the form of the preference file can be extended by the present invention. As such, the customized schema of the present invention can be tagged on to any application so long as the application as a preference so long as the application has an associated plugin operated to read and understand the preferences.

With continued reference to FIG. 4, the messaging service 116 is being used by Joe to transmit emails. In the illustrated embodiment, the messaging service 116 includes a preference handler plugin 116a and a Web-DAV plugin 116b. According to one aspect, a plugin is referred to a software program that has been integrated into another software application. In this manner, the plugin can extend the functionality of the software application. In one example, the plugins provide functionality that may not be provided by the software application. According to one embodiment of the present invention, a plugin is provided for each attribute and/or behavior the user would like to customize. Thus, in one instance, the attributes and/or behaviors that have a corresponding plugin in the messaging service 116 can be customized by the user. In one embodiment, a document plugin may be a piece of code that is operated to be plugged in with Joe's choice of mail client. The mail client can then convert the document attachment to a link to a web location (URL). In a different embodiment, the plugin may use secure socket layer to send emails to selected users.

According to one example, customizing groupware communication between Joe and the other members of the group who share the same message transfer protocol (e.g., MIME, SSH, etc.) as Joe can be achieved as follows: Joe defines a personal address book 104' to store Joe's preferences. In one instance, Joe's preferences are stored to a VCard. At this point, Joe can send an email to a member of the group using a mail client. In one example, the mail client is a software application implemented to send an email (e.g., Thunderbird, Microsoft Exchange, Gnome Evolution, etc.). Once Joe sends an email, the personal preference plugin associated with the mail client is used to send Joe's emails. In one example, the personal preference plugin determines whether the content of Joe's email and/or the receiver of Joe's email should be customized. If a decision is made that the content of Joe's email and/or the receiver of Joe's email should be customized, a respective plugin is called before the content of the email is sent to the messaging service 116. In one instance, a particular plugin may call yet another plugin. For instance, when Joe's email includes a document attachment, a Web-DAV attachment handler plugin is implemented before the attachment is sent to the messaging service. According to one exemplary embodiment, the group is an LDAP group. In one embodiment, the preference handler refers to writing a plugin (i.e., a piece of code) for each attribute in the schema. In one instance, the preference handler is added to the client (e.g., mail client) where the action originates.

Figure 5:
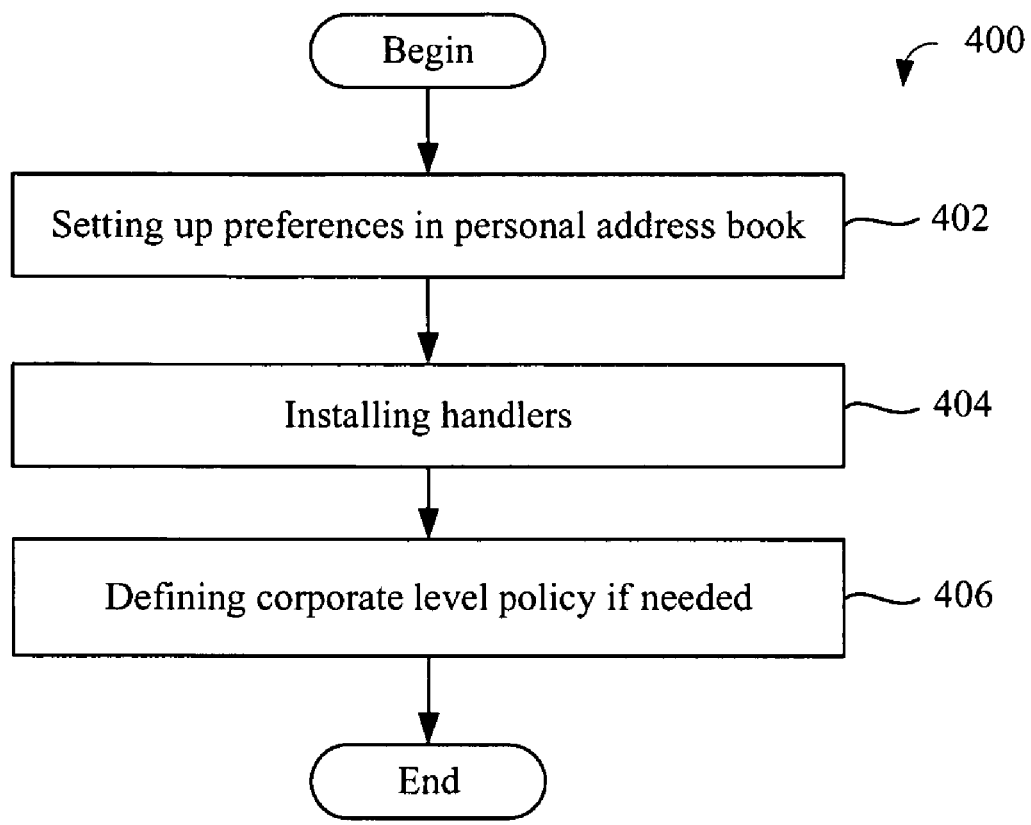
FIG. 5 depicts a flowchart diagram illustrating the method operations performed by a user to create customized entries in the user's personal address book, in accordance with yet another embodiment of the present invention.

Proceeding to FIG. 5, reference is made to a flow chart diagram 400 illustrating the method operations performed by the messaging service when a user creates customized entries in the user's personal address book, in accordance with one embodiment of the present invention. The method begins with operation 402 wherein the user sets preferences in the user's address book followed by operation 404 wherein a handler is installed. According to one example, the handler is installed by the system administrator so as to act on the new schematics. Next, the required corporate level policies are defined in operation 406. At this point, the customized preferences can be utilized by the user.

Figure 6:
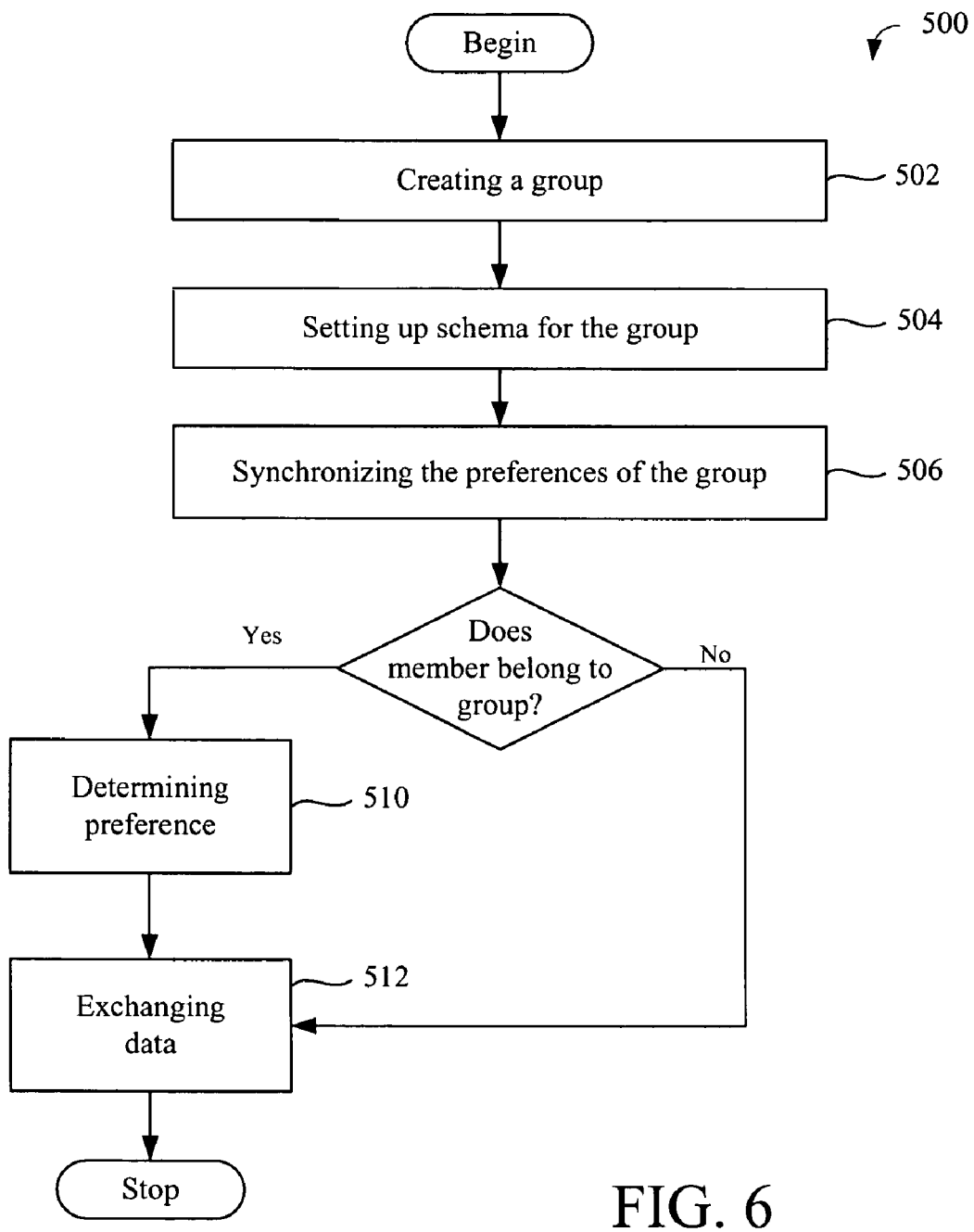
FIG. 6 depicts a flowchart diagram illustrating the method operations performed by a mail client when handling data exchange between members of a groupware, in accordance with yet another embodiment of the present invention.

FIG. 6 depicts a flowchart diagram 500 of method operations performed by the mail client so as to handle data exchange between members of a groupware, in accordance with one embodiment of the present invention. In operation 502, a group is created followed by the operation 504 wherein an schema is set up for the group. The preferences of the group members are synchronized in operation 506. At this point, a determination is made as to whether a user requesting communication is a member of the group in operation 508. If the user is not a member of the group, the method proceeds to operation 512 wherein the user exchanges data using normal data exchange methods. However, if the user is the member of the group, the method proceeds to operation 510 wherein a corresponding handler is used to determine the preferences set for the members of the group. Once the preferences have been determined, the method proceeds to operation 512 so as to proceed with normal data exchange methods.

Embodiments of the present invention may be implemented in various computer system configurations including hand-held devices, microprocessor systems, microprocessor-based or programmable consumer electronics, minicomputers, mainframe computers and the like. The invention can also be used in distributed computing environments where tasks are performed by remote processing devices that are linked through a wire-based or wireless network.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for setting up an schema to control the exchange of a document within a groupware environment, the groupware environment having an administrator, the method comprising:

identifying a preferred document type for the groupware environment;

determining a preferred document type for a participant of the groupware environment;

identifying a preferred communication protocol for the groupware environment;

determining a preferred communication protocol for a participant of the groupware environment; and determining a policy for the exchange of the document between the participant of the groupware environment and the administrator of the groupware environment based on the preferred document type and preferred communication protocol of the groupware environment and the preferred document type and preferred communication protocol of the participant;
wherein when the preferred document type and preferred communication protocol of the groupware environment match the preferred document type and preferred communication protocol of the participant, the policy defines a pointer to an address of the document on a storage of the groupware environment, the pointer being exchanged between the participant and the administrator instead of exchanging the document itself.

2. The method as recited in claim 1, wherein the operation of determining the policy for the data-exchange between the participant of the groupware environment and the administrator of the groupware environment is achieved while an implemented data-exchange protocol is maintained unaffected.

3. The method as recited in claim 2, wherein the operation of determining the policy for the data-exchange between the participant and the administrator includes,
implementing an alternative policy when the participant and the administrator agree on a mutual preferred document type and a mutual preferred communication protocol; and
implementing an original policy when the participant and the administrator disagree on the mutual preferred document type and mutual preferred communication protocol.

4. The method as recited in claim 3, wherein the operation of implementing the alternative policy when the participant and the administrator agree on the mutual preferred document type and mutual preferred communication protocol includes,
performing a matching of the preferred document type and preferred communication protocol of the participant and the preferred document type and preferred communication protocol of the groupware environment, or a negotiating between the preferred document type and preferred communication protocol of the participant and the preferred document type and preferred communication protocol of the groupware environment so as to arrive at the mutual preferred document type and mutual preferred communication protocol.

5. The method as recited in claim 4, wherein a privilege of the administrator is higher than a privilege of the participant.

6. The method as recited in claim 4, wherein the participant has been prohibited from overriding the preferred document type and preferred communication protocol of the groupware.

7. The method as recited in claim 6, wherein the preferred document type or preferred communication protocol of the groupware environment overrides the preferred document type or preferred communication protocol of the participant when the preferred document type or preferred communication protocol of the participant is different from the preferred document type or preferred communication protocol of the groupware.

8. The method as recited in claim 4, wherein the preferred document type or preferred communication protocol of the participant overrides the preferred document type or preferred communication protocol of the groupware environment when the preferred document type or preferred communication protocol of the participant is different from the preferred document type or preferred communication protocol of the groupware.

9. A method for implementing a customized attribute to control e-mail data-exchange between members of a group defined within a groupware environment, the method comprising:
determining a preferred customized attribute value of an owner of the group;
determining a preferred customized attribute value of a member of the group;
defining an schema to control e-mail data-exchange between the owner of the group and the member of the group;
selecting a policy for exchanging the e-mail data, the policy defining an attachment handling procedure;
the selecting the policy for the exchanging the e-mail data includes,
selecting a customized policy when the owner and the member agree on a mutual preferred customized attribute value, and
selecting an original policy when the owner and the member fail to agree on the mutual preferred customized attribute value; and
exchanging the data between the owner of the group and the member of the group in accordance with the selected policy;
wherein the owner emails the data to the member as an email attachment when the owner and the member fail to agree on a mutual preferred attribute value, and further wherein the owner emails an address of the data in a storage of the groupware environment to the member when the owner and the member agree on the mutual preferred attribute value.

10. The method as recited in claim 9, wherein the operation of exchanging the data between the owner of the group and the member of the group in accordance with the selected policy is achieved while an implemented data-exchange protocol is maintained unaffected.

11. The method as recited in claim 9, wherein the operation of selecting the customized policy when the owner and the member agree on the mutual preferred customized attribute value includes,
performing a matching of the preferred customized attribute value of the owner and the preferred customized attribute value of the member or a negotiating between the preferred customized attribute value of the owner and the preferred customized attribute value of the member so as to arrive at the mutual preferred customized attribute value.

12. The method as recited in claim 9, wherein a groupware environment administrator has a higher privilege than the owner of the group.

13. The method as recited in claim 12, wherein when the owner of the group and the member of the group have been prohibited from overriding a preferred customized attribute value of the groupware environment as set by the administrator, the preferred customized attribute value of the groupware environment overrides the preferred customized attribute value of the owner when the preferred customized attribute value of the groupware environment is different from the preferred customized attribute value of the owner.

14. The method as recited in claim 12, wherein the preferred customized attribute value of the owner overrides the preferred customized attribute value of the administrator when the preferred customized attribute value of the owner is different from the preferred customized attribute value of the owner, and further wherein the preferred customized attribute value of the member overrides the preferred customized attribute value of the owner when the preferred customized attribute value of the member is different from the preferred customized attribute value of the owner.

* * * * *